(12) United States Patent  
Moubarak

(10) Patent No.: US 10,443,662 B2  
(45) Date of Patent: Oct. 15, 2019

(54) MECHANICALLY COUPLED SYSTEM WITH VARIABLE LEVER ARM FOR TORQUE COUPLING AND DECOUPLING BETWEEN INPUT AND OUTPUT

(71) Applicant: Ford Global Technologies, LLC, Dearborn, MI (US)

(72) Inventor: Paul Moubarak, Redford Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 188 days.

(21) Appl. No.: 15/254,045

(22) Filed: Sep. 1, 2016

(65) Prior Publication Data

US 2018/0058506 A1   Mar. 1, 2018

(51) Int. Cl.
| F16D 3/60 | (2006.01) |
| F16D 3/72 | (2006.01) |
| F16D 43/04 | (2006.01) |
| F16D 43/14 | (2006.01) |

(52) U.S. Cl.
CPC ............ *F16D 3/60* (2013.01); *F16D 3/72* (2013.01); *F16D 43/04* (2013.01)

(58) Field of Classification Search
CPC ... F16D 3/60; F16D 3/72; F16D 43/04; F16D 43/14
See application file for complete search history.

(56) References Cited

U.S. PATENT DOCUMENTS

| 4,635,777 | A  | * | 1/1987 | Nickel | F16D 43/18 |
| | | | | | 192/105 CD |
| 4,754,669 | A  | * | 7/1988 | Verdier | B25B 21/00 |
| | | | | | 81/57.14 |
| 6,425,453 | B1 | | 7/2002 | Knutson et al. | |
| 7,137,499 | B2 | * | 11/2006 | Riefe | F16H 59/12 |
| | | | | | 192/220.2 |
| 8,177,018 | B2 | * | 5/2012 | Coleman | B62D 5/04 |
| | | | | | 180/444 |
| 2008/0121489 | A1 | * | 5/2008 | Chevalier | F16D 3/68 |
| | | | | | 192/105 BB |
| 2009/0001040 | A1 | * | 1/2009 | Kleiss | B66C 1/104 |
| | | | | | 212/242 |
| 2011/0105838 | A1 | * | 5/2011 | Fogel | A61B 1/012 |
| | | | | | 600/104 |
| 2014/0054123 | A1 | | 2/2014 | Gan | |

FOREIGN PATENT DOCUMENTS

GB     1482231     8/1977

* cited by examiner

*Primary Examiner* — Tinh T Dang  
(74) *Attorney, Agent, or Firm* — David Kelley; Brooks Kushman P.C.

(57) ABSTRACT

A selective torque transfer device is provided to transfer torque between one rotating component and a decoupled non-rotating component. The torque transfer device has an input shaft that extends along an axis and is connected to an input hub. The input shaft and input hub rotate about the axis on which they extend. A slider is disposed within the input hub and is capable of moving in a direction transverse to the axis. An output shaft extends along the axis and is connected to an output hub. The output shaft and output hub rotate about the axis on which they extend when the selective torque transfer device is in the engaged position. A link pivotally connects the output hub to the slider. The input hub is configured to rotate about its axis to create a torque.

19 Claims, 3 Drawing Sheets

MECHANICALLY COUPLED SYSTEM WITH VARIABLE LEVER ARM FOR TORQUE COUPLING AND DECOUPLING BETWEEN INPUT AND OUTPUT

TECHNICAL FIELD

This disclosure relates to torque transfer devices designed to selectively transfer rotational motion from an input shaft to an output shaft.

BACKGROUND

In automotive and turbo machinery applications, it is desired to decouple a rotating component from a torque source. Clutches and torque converters are primarily used to couple or decouple a torque source, e.g. internal combustion engine, electric motor and etc. from a torque shaft. Incorrect synchronization of the two rotating components often causes unwanted noise and unpleasant harshness when attempting to couple the two rotating components. Moreover, a blocked shift, where the rotating component is stuck or unable to engage the non-rotating component, occurs when the geometry profile of the mating components, the slip speed between the two components and the force applied does not permit a proper mesh between the rotating and non-rotating components.

SUMMARY

According to one embodiment, a selective torque transfer device is provided to transfer torque between one rotating component and a decoupled non-rotating component. The torque transfer device has an input shaft that extends along an axis and is connected to an input hub. The input shaft and input hub rotate about the axis on which they extend. A slider is disposed within the input hub and is capable of moving in a direction transverse to the axis. An output shaft extends along the axis and is connected to an output hub. The output shaft and output hub rotate about the axis on which they extend when the selective torque transfer device is in the engaged position. A link pivotally connects the output hub to the slider. The input hub is configured to rotate about its axis to create a torque. The slider may be displaced in a direction transverse the axis and torque is transferred from the input hub to the output hub. The transfer of torque between the input hub to the output hub occurs in response to the displacement of the slider away from the axis of the input hub. The amount of torque transferred from the input hub to the output hub is a function of the distance between the slider and the axis of the input shaft.

The selective torque transfer device has a disengaged position where the output shaft is not rotating, and an engaged position when the output shaft is rotating. The output shaft and the input shaft are mechanically connected while in the coupled and the uncoupled positions.

According to other embodiments, the selective torque transfer device may further comprise a bearing disposed on the output shaft that is connected to the output hub and is configured to provide axial movement of the output hub along the output shaft.

The selective torque transfer device may further comprise a rail disposed within the input hub and positioned perpendicular to the axis of the input shaft. The slider is configured to move along the rail in response to the axial movement of the output hub along the output shaft.

The selective torque transfer device may further comprise a shoulder outwardly extending from the slider and pivotally connected to the link, wherein the shoulder has an eccentric mass when the slider is offset from the axis of rotation.

The link of the selective torque transfer device is oriented diagonally with respect to the axis to counteract the eccentric mass of the shoulder.

The selective torque transfer device may further comprise a counterweight disposed adjacent to the link and the output hub, such that the counterweight is configured to counteract the eccentric mass of the shoulder.

The selective torque transfer device may further comprise at least one rail disposed within the input hub and perpendicular to the axis of the input shaft. The slider is configured to move along the rail in response to axial movement of the output hub.

In one embodiment, the rail has a first section having a first diameter and a second section having a second diameter. The diameter of the second section is greater than the first diameter of the first section. The first section is configured to allow the slider to move along the first section. The second section is configured to act as a travel stop for the slider.

The selective torque transfer device may further comprise a compression spring that is coaxial with the rail and is disposed between the slider in the input hub. The compression spring biases the slider to a position that is substantially in line with the axis of the input shaft and provides resistance to the movement of the slider away from the axis of the input shaft.

According to another embodiment, a selective torque transfer device is provided. The device includes an input shaft extending along an axis and attached to an input hub, as well as an output shaft extending along an axis and attached to an output hub. A slider is disposed within the input hub in a centered position substantially in line with the axis of the input hub and movable to an eccentric position offset from the center axis of the input hub. A link pivotally connects the slider to the output hub. When the output hub is displaced towards the input hub, the slider moves from the center position to the eccentric position to create a centrifugal force about the slider and a tangential force to the circle prescribed by the slider's rotation about the axis of the input hub, to transfer torque to the output hub.

The slider may be displaced in a direction that is substantially perpendicular to the axis of either the input shaft or the output shaft.

The amount of torque transferred to the output shaft may increase as the output hub moves closer to the input hub along the center axis.

The selective torque transfer device may further comprise a bearing disposed between the output shaft and the output hub, wherein the bearing is configured to enable axial movement of the output hub along the output shaft.

The selective torque transfer device may further comprise an output spline and an input spline that is disposed on the perimeter of an output shaft and input shaft. The input spline is sized to fit within the bearing.

In yet another embodiment, the link disposed between the input hub and the output hub may be a knuckle assembly comprising a single eye, a fork, and a knuckle pin. The single eye outwardly extends from either the slider or the output hub and defines an aperture. The fork may include at least two prongs defining at least two apertures. The fork may connect to either the slider or the output hub. A knuckle pin connects the single eye and the fork.

The selective torque transfer device may further comprise an output pin connecting the output hub to the link. The output pin is sized to allow pivotable movement between the link and the output hub.

A method for operating a selective torque transfer device is provided. In response to an engagement command and a desired output torque, the output hub is displaced. The output hub is pivotally linked to an input hub, and displaces a slider away from a center of the input hub to permit torque transmission between the input and output shafts.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A centrifugal force may be defined to include an apparent force that acts outward on a body moving around a center, arising from the body's inertia.

A tangential force may be defined to include a force which acts on a moving body in the direction of a tangent to the path of the body, its effect being to increase or diminish the velocity.

Figure 1:
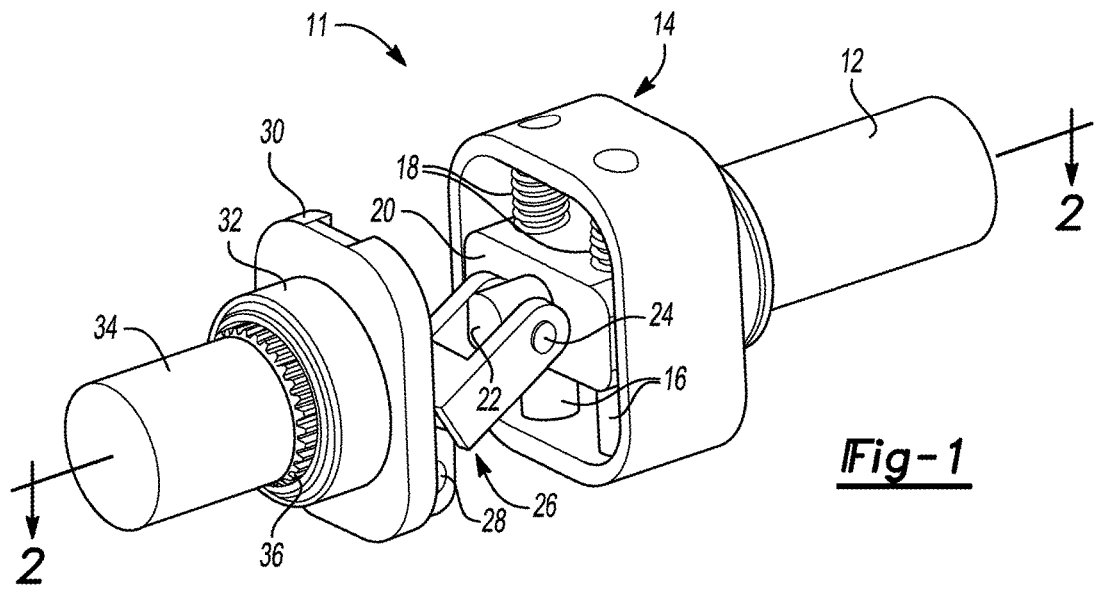
FIG. 1 is a perspective view of a selective torque transfer device.

Referring to FIG. 1, a selective torque transfer device 11 is illustrated that includes an input shaft 12 connected to an input hub 14 that extend along an axis. A slider 20 is positioned within the input hub 14 and attached to rails 16. The slider 20 is biased towards the center axis of the input shaft 12 by compression springs 18. A shoulder 22 extends from an aperture 21 defined by the slider 20 and is connected to a link 26 by the input pin 24. As the input shaft 12 and input hub 14 are rotated, the slider 20 may rotate about the shoulder 22. An output pin 28 connects the output hub to the link 26. A linear bearing 36 is attached to the output hub 30. The bearing 32 provides movement along the axis of the output shaft 34. An output spline 36 is disposed on the output shaft 34 and is configured to provide rotational movement of the output hub and the output shaft. An input spline 38 is disposed on the input shaft 12 and is configured to facilitate rotational movement between the input shaft 12 and the input hub 14.

Figure 2:
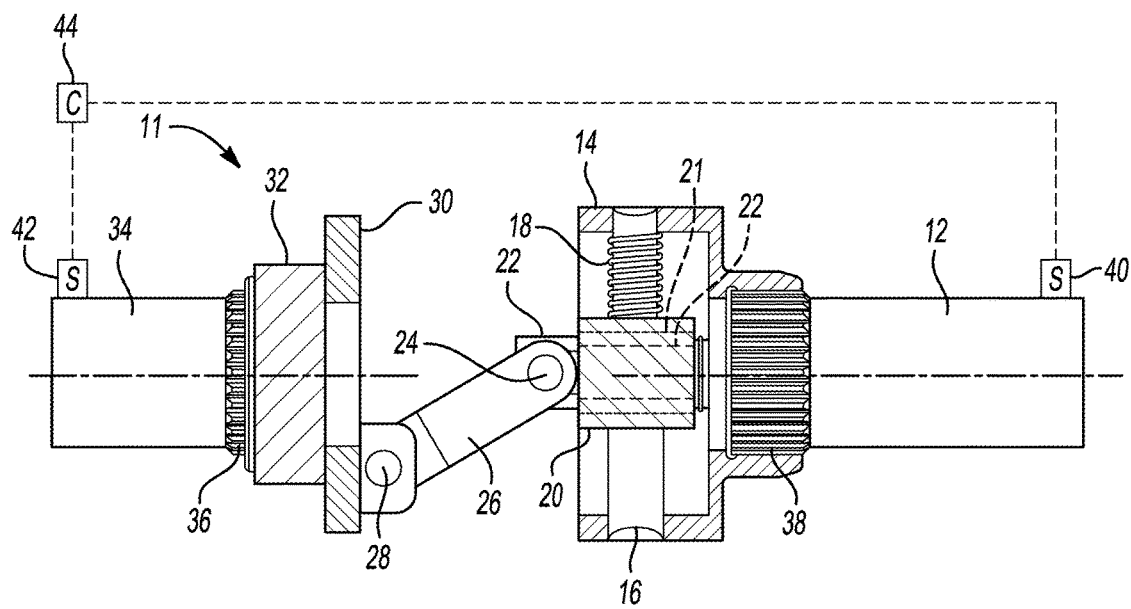
FIG. 2 is a side view of a selective torque transfer device in the disengaged state.

Referring to FIG. 2, a selective torque transfer device 11 in the uncoupled position is illustrated. Note, the term, "uncoupled" means rotational movement (e.g., torque) of the input hub 14 is not transferred to the output hub 30. It follows then that despite the mechanical connection between the input hub 14 and the output hub 30, through the slider 20 and the link 26, the transfer device 11 is in the uncoupled position because there is no transfer of torque between the input hub 14 and the output hub 30. The slider 20 is biased by the compression spring 18 at a position that is substantially in line with the central axis of the input shaft 12. The output hub 30 and link 26 are positioned such that the slider 20 remains in its biased position substantially in line with the central axis of the input shaft 12. As the input shaft 12 rotates, the slider 20 rotates in line with the axis of the input shaft 12. Because the slider 20 rotates in line with the axis, minimum tangential force is applied to the link and torque is not transferred from the input hub 14 to the output hub 30. The speed and torque transmission of the device is measured and controlled by a number of sensors and at least one controller. A speed sensor 40 detects the rotational speed of the input shaft 12. The speed is fed back to the controller 44. Another sensor 42 has the ability to detect the rotation of the output shaft 34.

Figure 3:
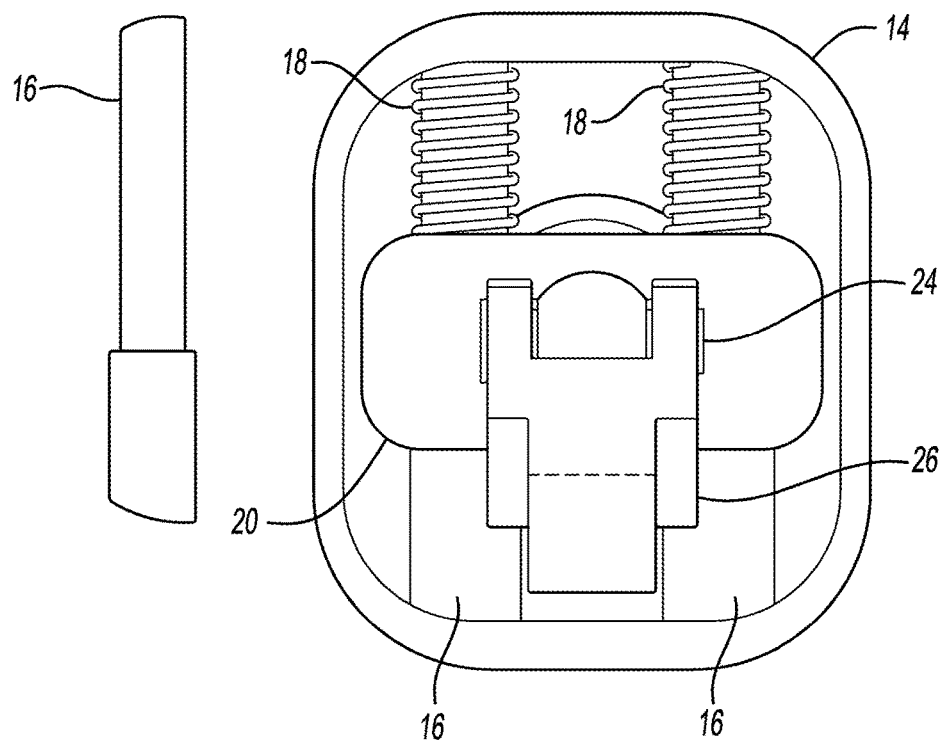
FIG. 3 is a front view of the input hub of the selective torque transfer device.

Referring to FIG. 3, a detailed view of the input hub 14 is illustrated. Rails 16 are disposed within the input hub 14 and stand substantially perpendicular to the central axis of the input shaft 12. The slider 20 is disposed on the rails 16 and is biased by the compression springs 18.

Figure 4:
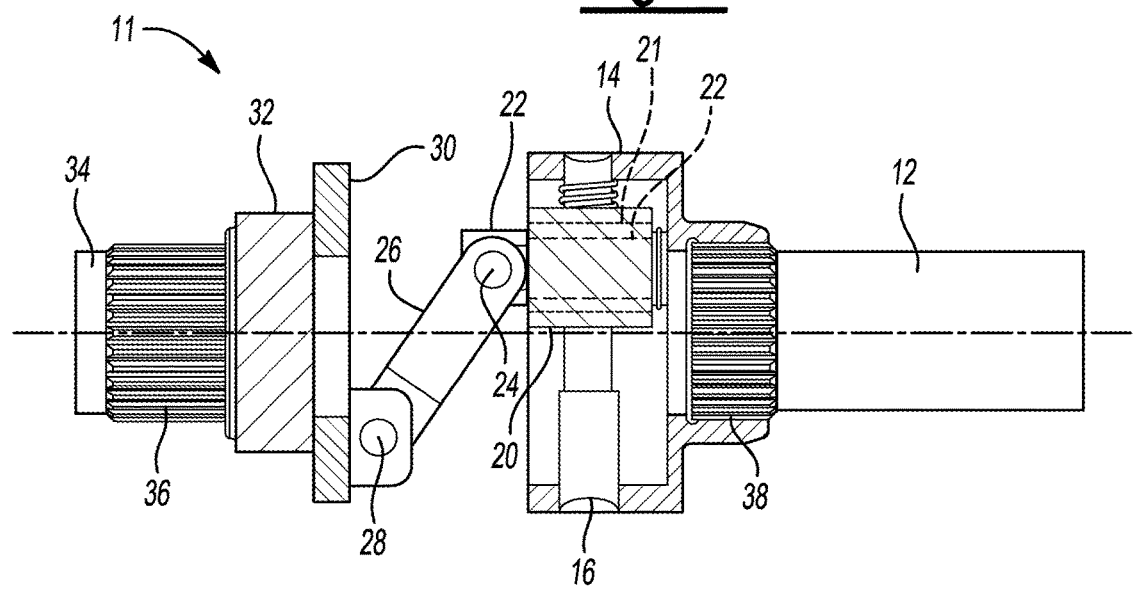
FIG. 4 is a side view of a selective torque transfer device in the engaged state.

Referring to FIG. 4, a selective torque transfer device 11 in the coupled position is illustrated. When the device is in the coupled position, the slider 20 is displaced away from the center of the input hub 14 while compressing the compression spring 18. The selective torque transfer device is placed in the engaged position by movement of the output hub 30 over the linear bearing 32 and along the axis of the output shaft 34. The link 26 is pivoted and the slider 20 is displaced transversely to the axis of the input shaft 12. Transverse or transversely is defined as including not only perpendicular and in a direction that is not along an axis, but rather in any direction across the axis. Because the slider 20 is no longer in alignment with the central axis of the input shaft 12 a force is created and torque is transferred between the input hub 14 and the output hub 30. For a constant input torque, the centrifugal force exerted about the slider 20 increases as the distance between the center of the slider and the central axis of the input shaft 12 increases. As the centrifugal force exerted about the slider increase the tangential force exerted about the output hub decreases.

A shoulder 22 extends outwardly from the slider 20 towards the output shaft 34. A link 26 is connected to the shoulder 22 by an input pin 24 and to the output hub 30 by an output hub pin 28.

Figure 5:
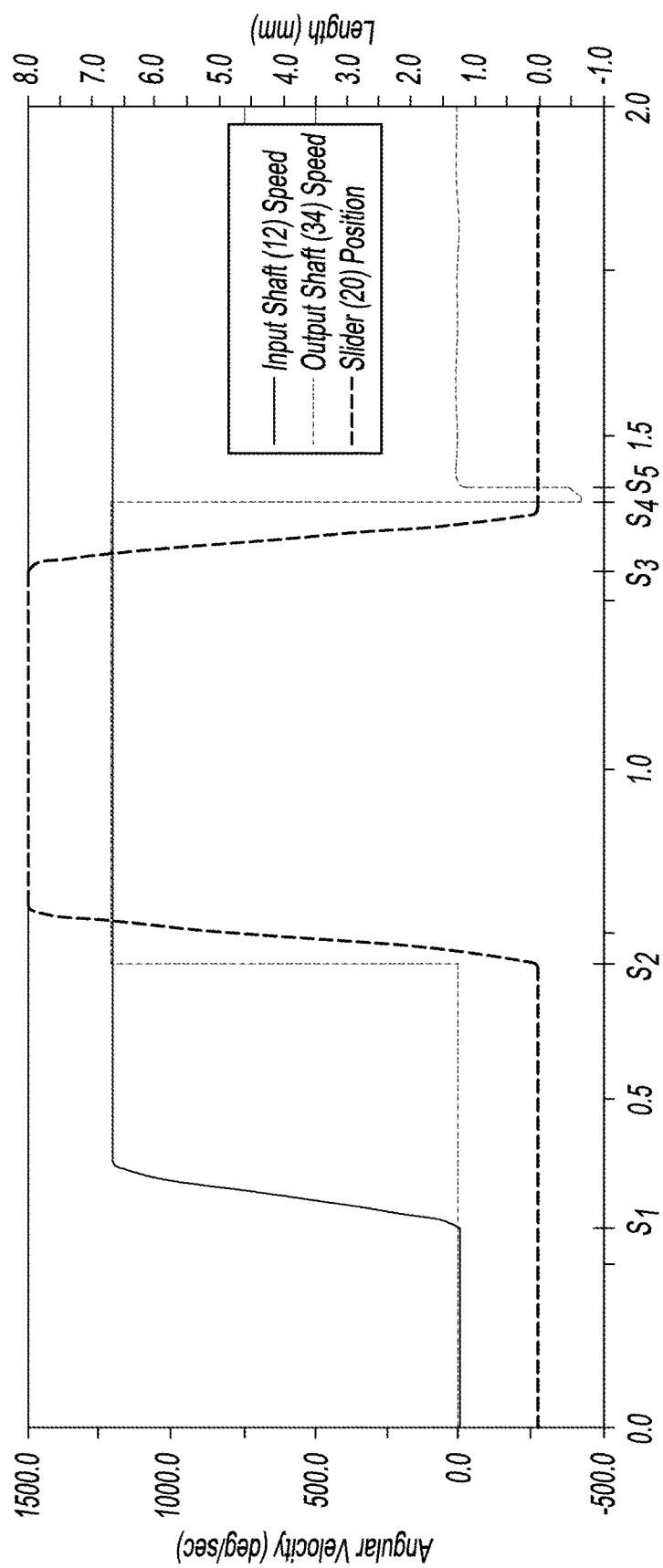
FIG. 5 is a graphical representation of the engagement and disengagement of the selective torque transfer device.

Referring to FIG. 5, a graphical representation of the engagement and disengagement of the selective torque transfer device is illustrated. The solid line represents the angular velocity or speed of the input shaft 12 over time. The dashed line represents the angular velocity or speed of the output shaft 34 over time. The phantom line, labeled Slider Position, represents the position of the slider with respect to the central axis of the input shaft 12. At S1 the speed of the input shaft is increased along the solid line and held constant. At S2 the slider 20 is displaced away from the center axis of the input hub 4. In response to the movement of the slider 20 the speed of the output shaft increases from zero to the same speed as the input shaft 12. At S3 the slider 20 is moved back to the center of the input hub 14. In response to this movement, the speed of the output shaft 34 decreases and changes direction briefly, as is shown between points S4 and S5, and then returns to zero. Such brief change of speed direction or overshoot can be attenuated by adding compliance to the embodiment, such as torsional springs on the output hub While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A selective torque transfer device comprising:
   an input shaft extending along an axis and connected to an input hub;
   an output shaft extending along the axis and connected to an output hub moveable along the output shaft;
   a slider biased in a centered position substantially in line of the center axis of the input hub, the slider being moveable to an eccentric position offset from the center; and
   a link pivotally connecting the output hub to the slider, wherein displacement of the output hub towards the input hub moves the slider from the centered position to the eccentric position to create a centrifugal force about the slider and transfer torque to the output hub.

2. The selective torque transfer device of claim 1, wherein the input hub is configured to rotate about the axis and the slider is bound to displace in a direction substantially perpendicular to the axis of either the input or output shafts.

3. The selective torque transfer device of claim 1, wherein the output and input hub are configured such that the torque transferred to the output shaft increases when the output hub is displaced closer to the input hub along the axis.

4. The selective torque transfer device of claim 1, further comprising a bearing disposed between the output shaft and the output hub, wherein the bearing is configured to enable axial movement of the output hub along the output shaft.

5. The selective torque transfer device of claim 4, further comprising a spline disposed on a perimeter of the output shaft, wherein the spline is sized to fit within the bearing.

6. The selective torque transfer device of claim 1, wherein displacement of the output hub towards the input hub, moves the slider from the centered position to the eccentric position to create a centrifugal force about the slider and a tangential force about the output hub.

7. The selective torque transfer device of claim 1, further comprising a shoulder, wherein the shoulder is rotatably coupled to the slider, and wherein when the slider is in the centered position, the slider rotates about the shoulder.

8. A selective torque transfer device comprising:
   an input shaft extending along an axis and connected to an input hub;
   an output shaft extending along the axis and connected to an output hub moveable along the output shaft;
   a slider moveable within the input hub in a direction transverse to the axis; and
   a link pivotally connecting the output hub to the slider.

9. The selective torque transfer device of claim 8, wherein the input hub is configured to rotate about the axis to create a torque, and when the slider is displaced in the direction transverse to the axis, the torque is transferred from the input hub to the output hub.

10. The selective torque transfer device of claim 8, wherein the torque transfer from the input hub to the output hub occurs in response to displacement of the slider away from the axis of the input hub.

11. The selective torque transfer device of claim 8, wherein the selective torque transfer device has an uncoupled state, in which the output shaft is not rotating, and a coupled state in which the output shaft is rotating, wherein the output hub and input shaft are connected while in the uncoupled state and the coupled state.

12. The selective torque transfer device of claim 8, wherein torque transferred from the input hub to the output hub varies as the distance between the slider and the axis of the input shaft varies.

13. The selective torque transfer device of claim 8, further comprising a bearing disposed on the output shaft and surrounded by the output hub, wherein the bearing is configured to enable axial movement along the output shaft.

14. The selective torque transfer device of claim 8, further comprising a shoulder outwardly extending from the slider and pivotally connected to the link, wherein the slider is an eccentric mass when the slider is offset from the axis.

15. The selective torque transfer device of claim 14, wherein the link is oriented diagonally with respect to the axis to counteract the eccentric mass of the slider.

16. The selective torque transfer device of claim 14, wherein the shoulder is rotatably coupled to the slider.

17. The selective torque transfer device of claim 8, further comprising at least one rail disposed within the input hub and perpendicular to the axis of the input shaft, wherein the slider is configured to move along the at least one rail in response to axial movement of the output hub.

18. The selective torque transfer device of claim 17, wherein the at least one rail has a first section having a first diameter and a second section having a second diameter, the second diameter being greater than the first diameter, wherein the slider is configured to move along the first section and the second section is configured to act as a stop.

19. The selective torque transfer device of claim 18, further comprising at least one spring coaxial with the at least one rail and disposed between the slider and the input hub, wherein the at least one spring biases the slider to a position substantially in line with the axis of the input shaft and opposes the movement of the slider when the output hub is moved axially towards the input hub.

* * * * *